Dec. 2, 1952 A. W. ELY 2,619,728
MEASURING AND LOCATION DEVICE
Filed March 26, 1948 3 Sheets-Sheet 1

Inventor
Alexander W. Ely
By Clarence A. O'Brien
and Harvey B. Jacobson
Attorneys Dec. 2, 1952 A. W. ELY 2,619,728
MEASURING AND LOCATION DEVICE
Filed March 26, 1948 3 Sheets-Sheet 2
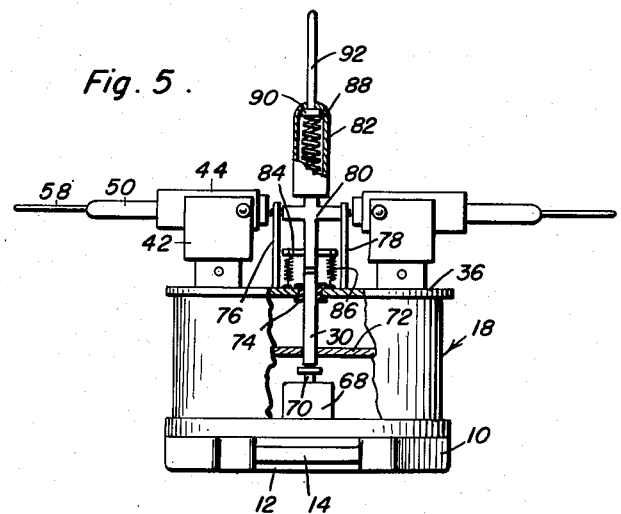
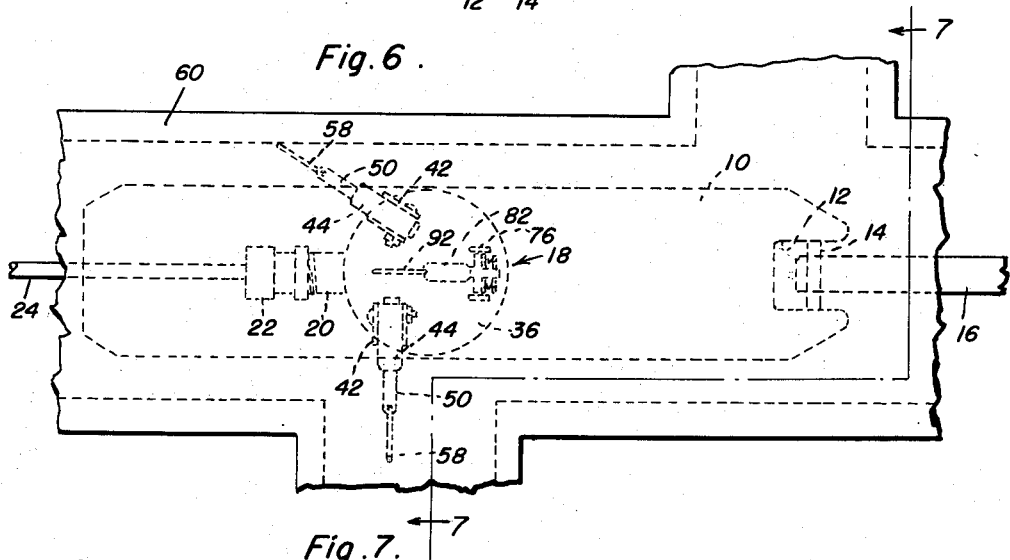
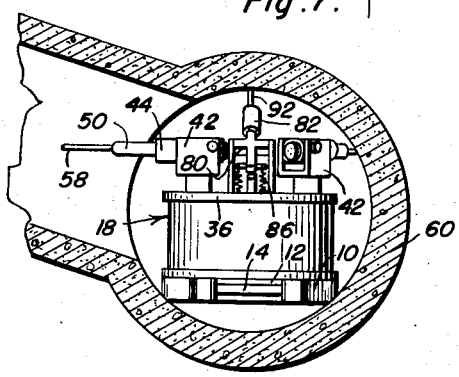
Inventor
Alexander W. Ely
By *Clarence A. O'Brien and Harvey B. Jacobson*
Attorneys Dec. 2, 1952   A. W. ELY   2,619,728
MEASURING AND LOCATION DEVICE
Filed March 26, 1948   3 Sheets-Sheet 3

Inventor
Alexander W. Ely

By Clarence A. O'Brien
and Harvey B. Jacobson
Attorneys

Patented Dec. 2, 1952

2,619,728

UNITED STATES PATENT OFFICE 2,619,728

MEASURING AND LOCATION DEVICE

Alexander W. Ely, Madison, Wis.

Application March 26, 1948, Serial No. 17,295

3 Claims. (Cl. 33—174)

This invention relates to novel and useful improvements in devices for measuring the distance from a selected end of a length of conduit, of a branch line.

Another object of this invention is to maintain a low center of gravity of a caliper device while pulling the same through a conduit, in order to maintain the runner in the proper position relative to the longitudinal axis of the conduit.

Another object of this invention is to give selected signals upon the advent of a branch line, indicating whether it is in the relatively starboard or port direction or the normal direction relative to the runner.

Another object of this invention is to supply a base member with a pair of plates which are adjustably spreadable to vary the size and width of the runner.

A still further object of this invention is to provide improved means for pulling the runner through a conduit.

Another object of this invention is to provide an improved device of the character described which performs intended function efficaciously.

Ancillary objects and features of novelty will become apparent to those skilled in the art, in following the description of the preferred form of the invention, illustrated in the accompanying drawings, wherein:

Figure 5 is an elevational front view of the first illustrated form of the invention, portions being broken away in section to illustrate details of construction;

Figure 6 is a plan view of a typical conduit system showing the invention in phantom applied;

Figure 7 is a sectional view taken substantially on the line 7—7 of Figure 6 and in the direction of the arrows;

This invention has been developed to provide a device for rendering operative signal devices which signal devices are energized upon the advent of a branch conduit within a main line. It is one of the prime purposes of the present invention to perform this duty in a more efficacious manner than has been heretofore known by devices somewhat similar in function and character.

Figure 2:
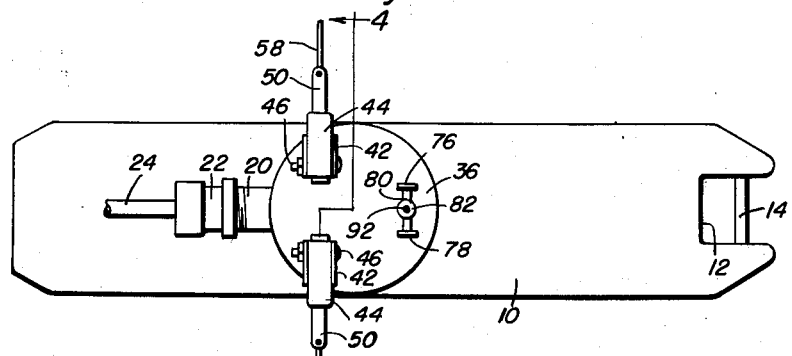
Figure 2 is a plan view of one form of the invention.
Figure 3:
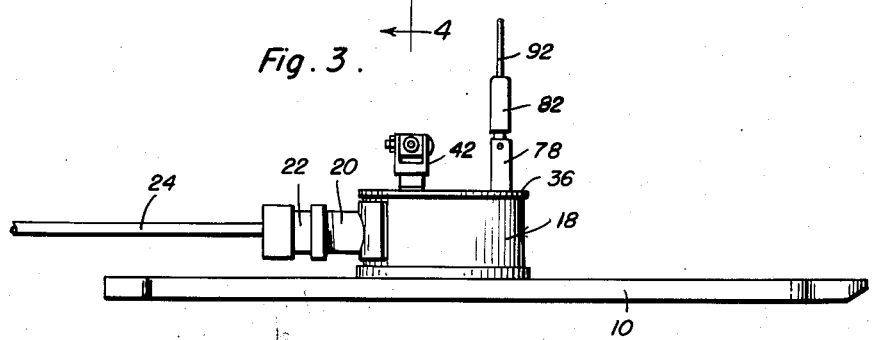
Figure 3 is a side view of the invention shown in Figure 2.
Figure 4:
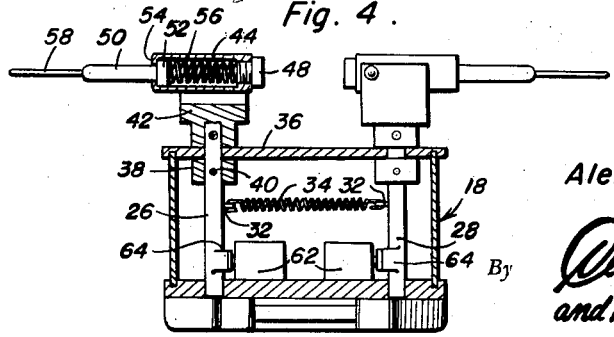
Figure 4 is a sectional view taken substantially on the line 4—4 of Figure 2 and in the direction of the arrows.

Referring primarily to Figures 2 and 4, there is illustrated a base 10 having a recess 12 at one end thereof. A pin 14 extends across the recess 12 and is adapted to anchor a cable 16 thereto, to be subsequently described.

Mounted on the base 10 is a housing 18 composed of any suitable material having a sleeve 20 communicated therewith. This sleeve has a threaded coupling 22 associated therewith for rigidly attaching electrical conductors therein. The said electrical conductors may be sheathed in a flexible tube or other flexible medium 24 in order that they may not be damaged.

Three pins 26, 28 and 30 are journalled in the said housing 18. The said pins 28 and 26 have hooks 32 secured thereto for receiving a spring 34 therebetween. By this means the said pins 26 and 28 are constantly resiliently biased.

The said pins 26 and 28 have identical structure appurtenant thereto and therefore, a description of only one will necessarily lead to a clear understanding of the other. The said pin 26 extends through the cover 36 of the said housing 18 and has a collar 38 attached thereto beneath the said cover. This collar may be attached by a set screw 40 or pinned thereto if so desired. On the opposite surface of the said cover 36 there is a bifurcated bracket 42 which is attached to the pin 26 and has a sleeve 44 pivoted thereto by any suitable means such as the bolt 46. This sleeve has a detachable plug 48 threaded in one end thereof and a feeler arm 50 slidably received adjacent the opposite end thereof and therein. An enlargement 52 on the said feeler 50 cooperates with a peripheral collar 54 formed on the said sleeve, thereby limiting the travel of the feeler 50. A spring 56 is seated on the said plug 48 and the enlarged head 52, thereby constantly biasing the pin 50 exteriorly of the sleeve 44. A feeler extension 58 may be received in the bifurcated terminal portion of the said feeler 50 as is seen in Figure 2.

In operation the opposed feeler mechanism including the feeler arm 50 with its extension 58 as well as the sleeve 44 and the bracket 42 are arranged transverse to the longitudinal axis of the base 10. These feelers are adapted to engage the side walls of a conduit 60 in operation.

A conventional switch 62 is seated in the said housing 18 adjacent each pin. The switch has an actuation rod associated therewith and an enlarged portion 64 is formed on each pin for cooperative movement with the actuation rod of the switches. Upon a predetermined movement of the pins, occasioned by operative engagement with the branch line of a conduit, the switches 62 are actuated.

Referring now to Figure 5 it will be noted that the switch 68 has its actuation plungers 70 arranged at 90° relative to the actuation plungers of the said switches 62. The bottom portion of the pin 30 rests on the actuation plunger 70 and upon a predetermined movement of the feeler mechanism, the said switch 68 is rendered operative.

A partition or other suitable bracket 72 is supplied in the said housing 18 and the said pin 30 is guided through a suitable aperture therein. A bushing 74 is supplied in the cover 36 for further feelingly maintaining the pin 30 in the proper position in its travel.

A pair of plates 76 and 78 respectively are attached to the said cover 36 and form a perch for the pivotal mounting of a substantially cross shape spider 80. One end of the spider's legs (opposed) maintain a sleeve 82 while the opposite end maintains a cross bar 84. The said cross bar 84 has a pair of springs 86 attached thereto, which springs are secured to suitable brackets on the said cover 36. The end of the legs bearing the cross bar 84 on the top surface of the pin 30 for actuation thereof.

The said sleeve 82 has a spring 88 seated therein which engages an enlarged portion 90 of a plunger or feeler arm 92. This feeler arm is of course, constantly biased exteriorly of the said sleeve 82 and the travel of the feeler arm 92 is restricted by means of operative engagement of the enlargement 90 with the bent portion of the terminal of the said sleeve 82. When a branch conduit extending in the pertinent direction from the main conduit 60 is approached and communicated with, the sleeve and feeler arm 82 and 92 respectively are sprung to a vertical position (relative to the base 10) thereby permitting the actuation of the plunger 70 which is appurtenant to the switch 68.

Figure 10:
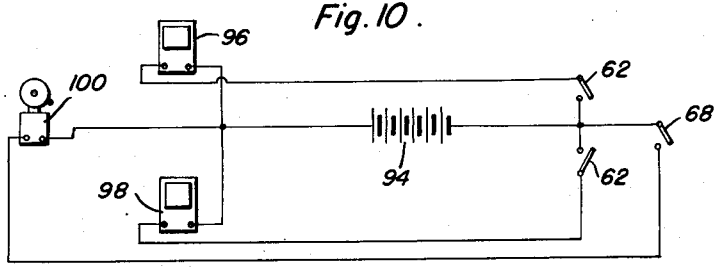
Figure 10 is a wiring diagram of the forms of the invention.

The actuation of the signal means is deemed readily apparent from inspection of Figure 10. Here the wiring diagram of the apparatus is disclosed. The switches 62 are indicated as is the switch 68. Upon actuation of any one of the switches current is permitted to flow from the source of power 94 through suitable pertinent conductors to a suitable signaling device such as the buzzers 96 or 98, or the bell 100. It is within the purview of the invention to substitute other signaling means such as suitable lamps in the place of the buzzers and bell. By the tonal emission in the instant illustration, the direction of the branch conduit may be readily ascertained.

Figure 11:
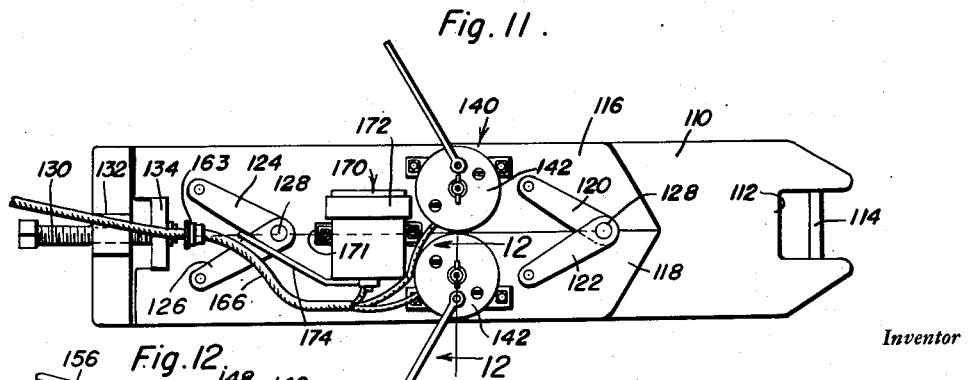
Figure 11 is a plan view of the second form of the invention.
Figure 12:
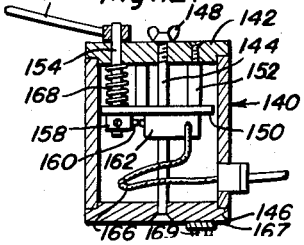
Figure 12 is a sectional view taken on the line 12—12 of Figure 11 and in the direction of the arrows.

Referring now to a second form of the invention, attention is directed primarily to Figures 11 and 12. Here, a base 110 which is intentionally made rather heavy as is the base 10, is supplied with a recess 112 at the forward end thereof and a pin or a suitable equivalent 114 associated therewith. A pair of plates 116 and 118 respectively are spreadingly received on the said base 110 and are pivotally associated with each other. These plates have pairs of pitman rods 120, 122 and 124, 126 associated therewith. The pitman rods of course, define the limit of travel of the plates 116, 118 relative to each other. Also, these pitman rods couple the plates together. The central pin 128 of the said pitman rods may extend through suitable apertures provided in the plate (thereby forming a slot) for attachment to the base 110.

An adjusting screw 130 is threadedly received in a suitable bearing 132 formed at one end of the base 110 and has one terminal portion received in a plate 134. The said plate 134 receives the terminal portion of the screw 130 freely therein and of course, the plate urges the said plates 116 and 118 in the spreading or contracting position. The actuation plate 134 may be attached to either one of the said plates 116 or 118 for this operation. Upon axial movement of the said screw 130, the desired spreading is accomplished.

It will be noted at this point that by the arrangement of the various appurtenances of this form of the invention as well as the first described form of the invention, the center of gravity of the entire device is maintained as low as possible and is centralized relative to the normal center of gravity of the base 110 considered alone.

A plurality of housings 140 having covers 142 are attached to the said plate. Reference to Figure 12 discloses the specific structure for the said housings 140, which includes a stay rod 144 extending through the cover or top 142 and the bottom 146. A wing nut 148 or the like may be utilized for attaching the cover and the bottom 146 as well as the entire housing assembled form.

A platform 150 is supplied in the said housing 140 and has a sleeve 152 seated thereon. A suitable screw or the like may be threadedly received in the bore of the sleeve for maintaining the platform 150 in the desired position. Of course, a plurality of these sleeves may be supplied in accordance with sound engineering dictates. Also journaled in the said platform 150 is a pin 154 which has a feeler arm 156 secured thereto. Seated beneath the said platform 150 is a collar 158 which has a suitable set screw or the like maintaining it to the pin 154. A protuberance 160 is formed on the collar 158 for operative engagement with the actuation plunger of a switch 162, which is also secured to the undersurface of the said platform 150.

Upon rotation of the said feeler arm 156, the pin 154 will be correspondingly rotated for subsequent actuation of the switch 162. This renders a signal operative through the medium of the conductor 166A threaded electrical jack is secured to the base 10 for detachably securing the conductor thereto. The actuation of the signal means in connection with this embodiment of the invention is identical with the signal means and the actuation thereof described in connection with the first form. It will be noted that a suitable spring 168 is seated on the said platform 150 and is secured to the cover 142. The spring is also secured to the pin 154. This maintains the positioning of the pin under spring tension tending to rotate its feeler arm against the inside surface of the conduit for efficient operation of the invention.

Inspection of Figure 11 clearly discloses the positioning of the two opposed housings 140 for a use similar to the opposed housings in connection with the first form of the invention. A third housing 170 is attached to the plate 110 by means of a suitable bracket 172 or the like and the internal structure thereof is identical to that illustrated in Figure 12. It will be noted however, that a single variation is incorporated and that is the feeler arm 174 association with the housing 170 and has a decided bend therein in order to center the end of the feeler arm relative to the longitudinal axis of the said base 110.

All of the said housings may be supplied with plates (see Figure 12) 167 on the undersurface thereof. These plates may have studs 169 attached thereto by any suitable means such as threading or the like. The opposite end of each of the said studs rest on the plates 116 and 118 or the base plate 110, the housings 140 having the prior construction while the housing 170 has the latter construction. Of course, a suitable slot 171 must be formed in the plates 116 and 118 in order to accommodate the base plate for the housing 170.

Figure 8:
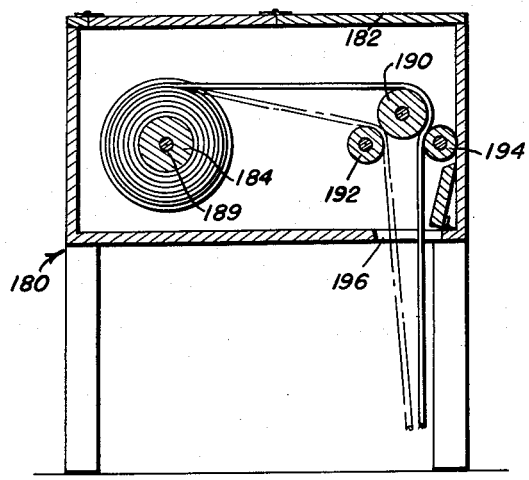
Figure 8 is a sectional view of the measuring means associated with the travel of the runner through the conduit.
Figure 9:
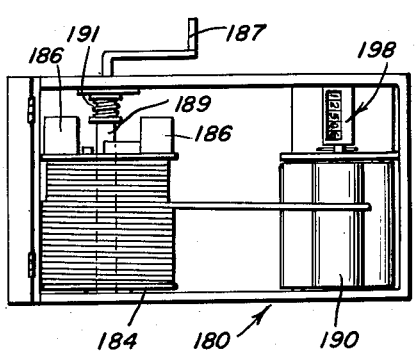
Figure 9 is a plan of the device shown in Figure 8.

Means are provided for measuring the distance that the runners described above, travel in a conduit. This means is illustrated in Figures 8 and 9 and includes two specific views. The first view illustrates a stand generally indicated at 180 which may be supplied with a hinged cover 182, when it is found desirable. A drum 184 is journaled in the said stand 180 and has the conductor 24 or 166 connected thereto. Batteries 186 and the bells or buzzers may be supplied on the said drum. A crank 187 is secured to the drum shaft 189 for actuation of the drum. The shaft 189 may be biased by the use of a conventional spring 191 which is seated thereon.

A roller composed of resilient material 190 is removably journaled in the said stand 180 and has either conductor entrained therearound. The second roller 192 preferably of resilient material is juxtaposed relative to the first roller and a final roller having a resilient sleeve 194 thereon is juxtaposed to the second roller. The specific arrangement of rollers may be seen best in Fig. 8 wherein the relatively large roller 190 is the center roller with the relatively small rollers 192 and 194 flanking the said center roller. The conductor is entrained therearound and extends through an opening guide 196. By this construction a substantially non-slip arrangement is provided and a suitable handle may be associated therewith for winding purposes. An indicator 198 may be associated with the shaft of the said roller 190 for indicating the amount of cable utilized, thus determining how far the runner has proceeded in the conduit 60.

Either form of the invention may be urged through conduit and the like by any suitable known means such as utilizing ordinary sticks made for this purpose, cable, tapes or other common devices.

Figure 1:
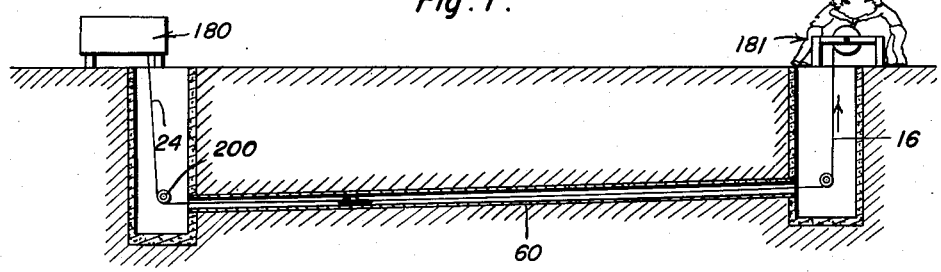
Figure 1 is a pictorial schematic view of the invention in use.

The preferable means for actuating the invention is of course, seen in Figure 1 wherein a device is illustrated as having a winding mechanism 181 which pulls the device through the conduit 60 by means of the cable 16. The conductor is played out from the drum 184. As it is played from this drum the rollers described above, are actuated thereby actuating the indicator 198 which may be graduated to indicate tenths, hundredths, or any other fractional portion of a foot.

As is seen in Figure 1 a guide 200 is supplied in one of the man holes for directing the conductor 24 or of course, the conductor 166. This guide may be detachably positioned in the man hole by any suitable means and is of adjustable nature for proper direction of the conductors.

It will be noted at this point that in larger pipe where the relative changes in diameter are not so great, a fixed plate is used for several sizes and the cylinders are raised to the required position. Also, in larger sewers the cylinders are used in multiple on each side in order to cover the larger surface.

Further, in the second embodiment of the invention the vertical height of the housings are adjusted through the utility of the described studs 169 by simply interchanging several side studs in accordance with the requirements of the particular job to be performed.

While there has been described but preferred forms of the invention, it is apparent that variations may be made without departing from the spirit thereof. Accordingly, limitation is sought only in accordance with the scope of the following claims.

Having described the invention, what is claimed as new is:

1. In a detection device for use with conduit, a base having plates thereon, means attaching said plates to said base for spreading movement, means for adjustably spreading said plates, housings positioned on said plates for movement there-with, a pin journaled in each of said housings, feeler arms to engage the side walls of a conduit and secured to said pins, switches in said housings, means secured to said pins for actuating said switches, signal means associated with said switches, a platform in each of said housings having a stay rod secured thereto and extending exterior of said housing, a collar secured to said pin and arranged to bear on said plate to prevent separation of said pin from said housing, a spring connected to said platform and said pin to yieldingly press said arms on said pins against the inside surface of the conduit, means for locking said stay rod to said housing, a cable secured to said base, and means connected with said cable to indicate the length of cable employed in moving the base through the conduit.

2. In a detection device for use in conduit, a base having plates with means connecting said plates to said base for spreading movement, means for adjustably spreading said plates, a housing secured to each of said plates, a platform in each of said housings, switches disposed in said housings, signal means located remote from said housings and electrically connected with said switches for control by said switches, pins journaled in said housings and journaled in said platforms, means for actuating said switches secured to said pins, conduit engaging feeler arms secured to said pins to rotate said pins to thereby actuate said switches, and means on said base for attaching a base motivating cable thereto.

3. In a detection device for use in conduit, a base having plates with means connecting said plates to said base for spreading movement, means for adjustably spreading said plates, a housing secured to each of said plates, a platform in each said housings, switches disposed in said housings, signal means located remote from said housings and electrically connected with said switches for control by said switches, pins journaled in said housings and journaled in said platforms, means for actuating said switches secured to said pins, conduit engaging feeler arms secured to said pins to rotate said pins to thereby actuate said switches, means on said base for attaching a base motivating cable thereto, and resilient means connected to said pins for yieldingly pressing said arms against the inside surface of the conduit.

ALEXANDER W. ELY.

REFERENCES CITED

The following references are of record in the file of this patent:

UNITED STATES PATENTS

| Number | Name | Date |
|---|---|---|
| 251,662 | Webb | Dec. 27, 1881 |
| 549,444 | Dailey | Nov. 5, 1895 |
| 1,631,562 | Thompson | June 7, 1927 |
| 1,893,600 | Shull | Jan. 10, 1933 |
| 2,074,753 | McClain | Mar. 23, 1937 |
| 2,102,080 | Kinley | Dec. 14, 1937 |
| 2,241,401 | Haskell | May 13, 1941 |
| 2,245,792 | Kuhn | June 17, 1941 |
| 2,322,343 | Brandon | June 22, 1943 |

FOREIGN PATENTS

| Number | Country | Date |
|---|---|---|
| 212,285 | Germany | July 27, 1909 |
| 230,860 | Germany | Feb. 7, 1911 |
| 480,868 | England | Mar. 2, 1938 |
| 551,956 | England | Mar. 17, 1943 |